Dec. 17, 1957 W. H. GALLOWAY 2,816,795
AUXILIARY WIND WING AND SUPPORT POST FOR
CONVERTIBLE TYPE VEHICLES
Filed Aug. 31, 1956
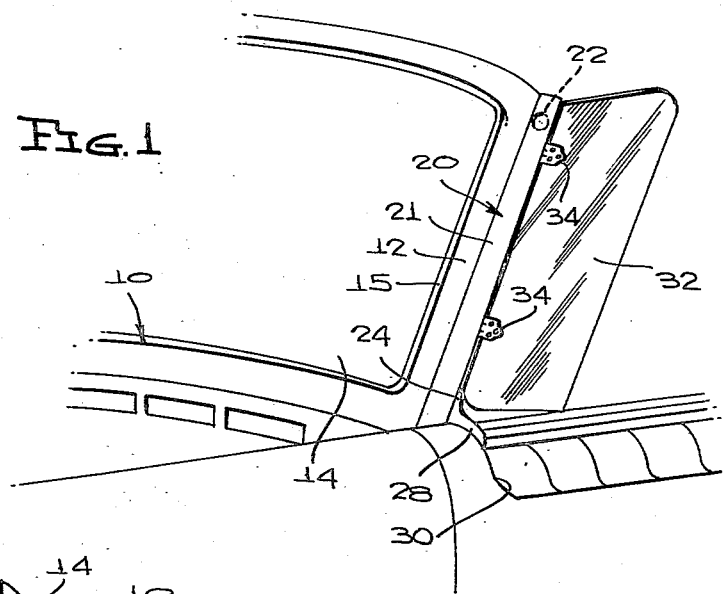
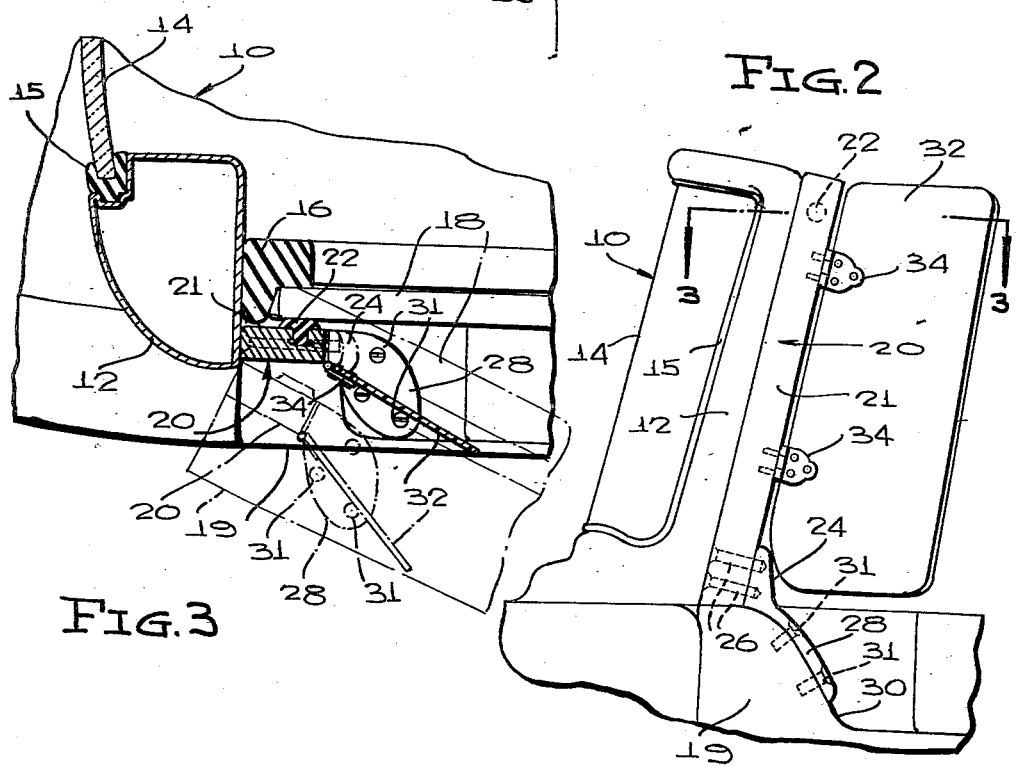
INVENTOR.
WILFRED H. GALLOWAY
BY
McMorrow, Berman & Davidson
ATTORNEYS

United States Patent Office 2,816,795
Patented Dec. 17, 1957

2,816,795
AUXILIARY WIND WING AND SUPPORT POST FOR CONVERTIBLE TYPE VEHICLES

Wilfred H. Galloway, Reseda, Calif.

Application August 31, 1956, Serial No. 607,346

3 Claims. (Cl. 296—84)

This invention relates to wind wings for vehicles, that is, to the wings or flaps that may be provided at the opposite sides of the vehicle adjacent the ends of the windshield, for the purpose of deflecting wind outwardly of the vehicle while still assuring proper ventilation of the vehicle interior. Devices of this type may sometimes also be known as ventilating flaps, side shields, deflector wings, etc., and it will be understood that the invention is intended to encompass any of these various devices used at the location mentioned and for the purposes specified.

Many vehicles are, of course, equipped with wind wings as part of the vehicle when the same is manufactured, this being particularly true of sedans, etc. However, some vehicles are not equipped with wind wings as a matter of the basic construction of the vehicle, and this is particularly true of some of the smaller sports cars, convertibles, roadsters, etc.

The main object of the present invention is to provide wind wings that are so designed as to be particularly adapted as attachments for well known vehicles of modern design, the wind wings thus falling in the accessory class.

Another object is to provide wind wings that will be particularly designed to be seemingly part of the basic complement of the vehicle.

A further object is to so design the wind wings that they will be capable of being mounted upon the vehicle with maximum ease and speed, the construction being such, in fact, as to permit attachment of the device in a few minutes.

Still another object is to provide wind wings that will be so designed as to be mountable on the door of the vehicle, so as to swing outwardly with the door when the same is opened, with the wings being, nevertheless, formed in such a manner as to be seemingly attached to the end posts of the windshield.

Yet another object of importance is to form the wind wings in a manner such that they will not produce any blind spots during operation of the vehicle.

Yet another object of importance is to form wind wings for vehicles which will be capable of manufacture at a very low cost, considering the benefits to be obtained from the use thereof, the durability of the device, and the attractiveness of the same.

Other objects will appear from the following description, the claims appended thereto, and from the annexed drawing, in which like reference characters designate like parts throughout the several views, and wherein:

Figure 1 is a fragmentary prospective view of a vehicle equipped with a wind wing according to the invention;

Figure 2 is an enlarged, fragmentary side elevational view of the wind wing and the cooperating portions of the vehicle; and Figure 3 is a horizontal section, the scale being still further enlarged, on line 3—3 of Figure 2, the door and wind wing being shown in full lines in closed position and in dotted lines in the positions assumed thereby when the door is opened.

Referring to the drawings in detail, designated generally at 10 is a vehicle of modern design. In this connection, the wind wing illustrated is particularly designed to be mounted upon a "Nash Metropolitan" of the 1954–1956 year models.

It will be understood, however, that the wind wing could be designed for mounting on other vehicles, such as foreign sport cars, etc. The wind wing is particularly adapted for installation in open sports cars and roadsters, as well as in so-called "hard top" convertibles and in convertibles having tops of canvas or other flexible material.

In any event, the illustrated vehicle has the usual corner post 12 at the end of the windshield 14, the corner post constituting one end of a windshield-receiving frame, which frame includes a grooved rubber molding 15 receiving the periphery of the windshield 14.

The vehicle also includes a rubber molding strip 16 (Figure 3) secured to the inner or rearwardly facing surface of the corner post 12, to provide a rest for the side window 18 which is raised and lowered in a channel provided in the vehicle door 19.

The invention has been generally designated at 20, and includes a support post 21 formed of steel or other rigid material, which may be painted to match the color scheme of the vehicle, chrome-plated, or otherwise ornamentally finished. Post 21 extends the full distance between the top edge of door 19 and the upper end of post 12, and in inclined from the vertical correspondingly to the post 12 as shown in Figure 2, so as to be in face-to-face contact with the post over the full lengths of the post 12 and support standard 21 of the invention.

Adjacent its upper end, the inner side surface of the standard 21 has an undercut opening (see Figure 3) receiving the complementarily formed inner end of a soft rubber button 22. The purpose of the rubber button is to engage the outer side of the window pane 18 to prevent rattling of the window against the supporting standard 21 of the invention.

Secured to the lower end of the standard 21 is a mounting foot or bracket 24, having vertically spaced, threaded openings receiving screws 26 that extend transversely through the lower end portion of standard 21, through smooth-walled openings of the standards that are in registration with the recesses or openings of the mounting bracket. Bracket 24 is so shaped as to fit an adjacent portion of the door 19. In the illustrated example, being mounted upon a vehicle of the make and year hereinbefore specified, it is of approximately obtuse-angular shape, with an upwardly projecting portion into which the screws 26 extend and an elongated, longitudinally curved lower portion 28 bearing against the front wall of a recess 30 formed in the outer wall of the door 19. Screws 31, as shown in Figures 2 and 3, are extended through countersunk, smooth-walled openings of the bracket 28, into threaded openings of the door 19. It will be understood that any type of fastening elements can be employed, such as self-tapping screws, etc., if desired, without departure from the spirit of the invention.

As shown in Figure 3, the door-attached portion 28 of the mounting bracket 24 is formed as a flattened, widened element, again for the purpose of conforming to the configuration of the particular door 19 on which the device is mounted. When the device is mounted on other makes of vehicles, having doors shaped otherwise than as shown, the mounting bracket would, of course, be adapted as necessary to said other doors.

A deflector panel 32 is formed from plastic, in a preferred embodiment, although any suitable transparent material may be employed. The panel 32 is substantially coextensive in length with the standard 21, and at its leading side edge is connected hingedly to the standard by means of hinges 34 which may be ornamentally finished in any desired manner, the deflector panel thus swinging about an axis extending longitudinally of the standard 21 at the back edge of the standard.

The standard is free of connection to the corner post 12, and is connected only to the mounting bracket 24, which as previously mentioned is attached directly to the door 19 of the vehicle. The standard, at the same time, is in longitudinal contact with the corner post 12, so as to be seemingly connected thereto and, in fact, to be seemingly a part of the corner post construction.

By reason of this arrangement, the wind wing seems to be a part of the vehicle in the form of which the vehicle is manufactured, rather than a separate attachment or accessory. This adds to the attractiveness of the device and of the vehicle on which it is mounted.

Despite the fact that the device seems to be a part of the vehicle as manufactured, it can be readily attached to or detached from the vehicle with maximum ease and speed, merely by extending the screws 31 into the wall of the door 19.

An important feature of the invention is that the device is mounted in such a manner that it swings outwardly with the door when the door is opened, as will be readily noted by comparison of the full and dotted line positions of Figure 3.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, and the means presently devised to carry out said principles, it being considered that the invention comprehends any minor change in construction that may be permitted within the scope of the appended claims.

What is claimed is:

1. A wind wing for mounting on the door of a vehicle adjacent the corner post of the vehicle, comprising an elongated, straight standard adapted to extend in longitudinally contacting relation with the corner post; a mounting bracket connected to the lower end of the standard, said bracket having a portion projecting rearwardly from the standard and adapted for fixed connection to a vehicle door; a deflector panel hingedly connected to the standard; and means on the standard adapted to provide a cushion for engagement with a window carried by said door to prevent rattling of the window against the standard.

2. A wind wing for mounting upon the door of a vehicle adjacent a corner post of the vehicle, comprising an elongated, straight standard adapted along one longitudinal edge thereof for extension in longitudinally contacting relation with said corner post, said standard being proportioned at its lower end for resting upon the top edge of the vehicle door; a mounting bracket for attaching the standard fixedly to the door, said bracket having an upwardly projecting portion fixedly connected to the lower end portion of the standard and a rearwardly extending portion adapted for fixed connection to a vehicle door; and a deflector panel having a hinged connection to the standard at the other longitudinal edge of the standard.

3. A wind wing for mounting upon the door of a vehicle adjacent a corner post of the vehicle, comprising an elongated, straight standard adapted along one longitudinal edge thereof for extension in longitudinally contacting relation with said corner post, said standard being proportioned at its lower end for resting upon the top edge of the vehicle door; a mounting bracket for attaching the standard fixedly to the door, said bracket having an upwardly projecting portion fixedly connected to the lower end portion of the standard and a rearwardly extending portion adapted for fixed connection to a vehicle door; and a deflector panel having a hinged connection to the standard at the other longitudinal edge of the standard, said bracket being formed substantially to an obtuse-angular shape with one leg of the angle defined by the bracket being the portion connected to the standard and the other leg being the portion connected to the vehicle door.

References Cited in the file of this patent

UNITED STATES PATENTS

| 1,861,828 | Wright | June 7, 1932 |
| 2,022,087 | Morrison | Nov. 26, 1935 |
| 2,567,153 | Jackson | Sept. 4, 1951 |